US008515859B2

(12) United States Patent
Tzroya

(10) Patent No.: US 8,515,859 B2
(45) Date of Patent: Aug. 20, 2013

(54) CONSOLE, SYSTEM AND METHOD FOR PROVIDING AN INTERFACE TO A FINANCIAL MARKET TRADING SYSTEM OR TO A FINANCIAL MARKET BASED GAMING SYSTEM

(76) Inventor: Ilan Tzroya, Sofia (BG)

(*) Notice: Subject to any disclaimer, the term of this patent is extended or adjusted under 35 U.S.C. 154(b) by 0 days.

(21) Appl. No.: 13/607,839

(22) Filed: Sep. 10, 2012

(65) Prior Publication Data
US 2013/0006833 A1 Jan. 3, 2013

Related U.S. Application Data

(63) Continuation of application No. 12/493,556, filed on Jun. 29, 2009, now Pat. No. 8,275,694.

(60) Provisional application No. 61/077,180, filed on Jul. 1, 2008, provisional application No. 61/077,181, filed on Jul. 1, 2008.

(51) Int. Cl.
G06Q 40/00 (2012.01)

(52) U.S. Cl.
USPC .......................................................... 705/37

(58) Field of Classification Search
USPC .................................................. 705/35–45
See application file for complete search history.

(56) References Cited

U.S. PATENT DOCUMENTS

| 7,657,477 | B1* | 2/2010 | Chaffee | 705/36 R |
|---|---|---|---|---|
| 7,711,628 | B2* | 5/2010 | Davie et al. | 705/37 |
| 7,783,552 | B2* | 8/2010 | Assia et al. | 705/36 R |
| 7,827,092 | B2* | 11/2010 | Chait et al. | 705/37 |
| 8,275,694 | B2* | 9/2012 | Tzroya | 705/37 |
| 2002/0032636 | A1* | 3/2002 | Shields et al. | 705/37 |
| 2005/0027643 | A1* | 2/2005 | Amaitis et al. | 705/37 |
| 2005/0197938 | A1* | 9/2005 | Davie et al. | 705/35 |
| 2005/0240500 | A1* | 10/2005 | Schlunk | 705/30 |
| 2007/0168279 | A1* | 7/2007 | D'Angelo | 705/39 |
| 2009/0216685 | A1* | 8/2009 | Rosen et al. | 705/36 R |

OTHER PUBLICATIONS

Olsen, Stefanie, "AmEx unveils "disposal" credit card number", CNET News.com, Sep. 7, 2000, pp. 1-3.*

* cited by examiner

Primary Examiner — Mohammad Z Shaikh
(74) Attorney, Agent, or Firm — Vladimir Sherman; Professional Patent Solutions

(57) ABSTRACT

The present invention is a console, system and method for providing an interface to a financial market trading system or to a financial market based gaming system. The invention enables the trader to trade on financial markets using an interface simulating known and popular games from the world of sports, arcade, games of chance, strategic games and the like.

18 Claims, 9 Drawing Sheets

Fig. 6
Fig. 6A
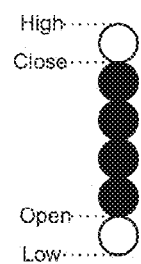
Fig. 6B
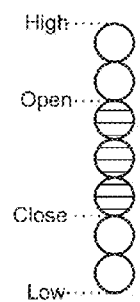
● = Lit Blue LED
⊖ = Lit Red LED
○ = Shaded LED
Fig. 6C
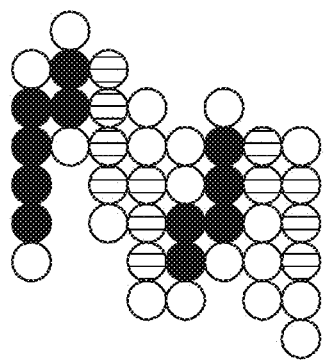

CONSOLE, SYSTEM AND METHOD FOR PROVIDING AN INTERFACE TO A FINANCIAL MARKET TRADING SYSTEM OR TO A FINANCIAL MARKET BASED GAMING SYSTEM

CROSS REFERENCE

This application is a continuation of U.S. patent application Ser. No. 12/493,556, filed on Jun. 29, 2009, which claims priority from U.S. Provisional Patent Application No. 61/077,180, filed on Jul. 1, 2008 and U.S. Provisional Patent Application No. 61/077,181 filed on Jul. 1, 2008, each of which are hereby incorporated into this application by reference in their entirety.

FIELD OF THE INVENTION

The present invention generally relates to the field of Financial Market related trading and gaming. More specifically, the present invention relates to a console, system and method for providing an interface to a financial market trading system or to a financial market based gaming system.

BACKGROUND

Electronic trading, sometimes called e-trading, is a method of trading securities (such as stocks and bonds), currencies, exchange traded derivatives and other financial instruments via distributed data networks—electronically. Electronic trading generally uses information technology systems, such as the internet and proprietary networks, to bring together buyers and sellers on electronic trading platforms to create virtual market places which augment or connect with existing trading systems. NASDAQ, NYSE, Arca and Globex are examples of markets which are augmented with and/or strongly interconnected to electronic trading systems. Exchanges that facilitate electronic trading in the United States are regulated by the Securities and Exchange Commission or [SEC] and are generally called electronic communication networks or ECNs.

The foreign exchange market (Forex, or FX) is where currency trading takes place. Forex trading is defined as the simultaneous buying of one currency, and selling of another. The currency of one country is exchanged for that of another. The currencies may be traded in pairs such as US-Dollar/Japanese-Yen, Euro/US-Dollar, Brazilian-Real/Jordanian-Dinar and so on.

At or about 1996, on-line retail Forex trading became practical. Internet-based market makers would take the opposite side of retail trader's trades. These companies also created a retail Forex platform that provided a quick and easy way for individuals to buy and sell on the Forex spot market Nowadays, one can trade virtually any financial instrument, online, through a variety of electronic trading service providers. In order to trade, however, one must be connected to the appropriate service provider and have an agreement and account with said service provider. A stand alone interface, which anyone can walk up to, deposit funds in and trade on, is yet unknown.

At the same time, a plethora of gaming sites is available online. Anyone who so desires can connect to such a site and play virtually any known game of chance for money. Again, in order to play one must be connected to the appropriate gaming service provider and must have an agreement and account with said gaming service provider. Unlike the previous example, stand alone interfaces to which anyone can walk up to, deposit funds and play, are readily available.

Most games of chance are based on a random element/event/outcome, which determines whether a game participant wins or losses. This element can be a slot where a ball falls (Roulette), a random card (Blackjack, poker etc.), a roll of dice (craps), a combination of reel spins (Slots), a combination of numbered balls drawn randomly from a large group (Keno or Bingo) or any other unpredictable random event. Therefore, as the determining event is completely random, a participant in such a game has little to no control over his chances of winning and is left to depend on good fortune to gain money from the game.

Another form of gaming available online is based on exterior events, which are not random but at the same time are not easily predictable. In these forms of games the outcome of an exterior event determines whether the participant wins or losses. An example of such gaming is sports betting. As the outcome of sporting events is not random, so a participant in such a game can improve his chances of winning the more he/she knows about the event. Such gaming is also available based on non-sporting events. For example, one can bet online who will win a particular award (e.g. Oscar for Best Picture), what will be the first commercial aired during the Superbowl or even who will win an election. A game, however, where the determining event is the behavior/trade details of a specific financial instrument on a specific market, is unknown.

SUMMARY OF THE INVENTION

Definitions
F.I.=any financial instrument which is traded on a market, e.g. stocks, bonds, currencies, options, commodities, future contracts, etc.
Broker=a financial instruments trading service provider.
Market data provider=a source which provides information relating to the trading of F.I.'s on one or more exchanges which provide platforms for trading of F.I.'s, e.g. price, trade volume, price fluctuation, etc.
Behavior/Trade Details of a F.I.=any parameter relating to the trade of a given F.I. on a given exchange, e.g. price, trade volume, price fluctuation, etc.
F.I.G.T. System=a system constructed in accordance with this invention.
Remote Devices=any device including a display and a user interface and adapted to communicate over a distributed data network, such as the internet (e.g. mobile phones).

The present invention is a console, system and method for providing an interface to a financial market trading system or to a financial market based gaming system. According to some embodiments of the present invention, there may be provided one or more financial markets related (gaming or trading) consoles, which one or more consoles may be networked, directly or through a distributed network, with a server or server cluster including at least one transaction server. According to some embodiments of the present invention, the server or server cluster may be integral with the consol. According to further embodiments of the present invention the transaction server and/or server cluster may be further networked, directly or through a distributed network, with a control terminal(s), an administration terminal, remote devices, brokers, financial institutions, market data providers and/or a trading server.

According to some embodiments of the present invention, the financial markets related (gaming or trading) console(s) may include one or more displays, one or more user interface assemblies, one or more payment receipt modules (i.e. cash, credit card, tokens, other cards and/or any other known payment method), a communication module and a processor adapted to regulate the operation of all the console's constituent components in the context of a F.I. associated trading/gaming environment. The processor may be functionally associated with the communication module. The communication module may be adapted to communicate, over a data network, with one or more servers, including a transaction server, a gaming server and/or any other server types functionally relevant to F.I. based trading or gaming.

According to some embodiments of the present invention the server cluster may include a transaction server, a router/switch, an accounts database, a F.I. related data database, a game data base, a trading module, a F.I. related data analyzer, a gateway, a gaming server and/or any other server types functionally relevant to F.I. based trading or gaming. The servers within the cluster may each be functionally associated with a communication module. Any and all computational architecture known today or to be devised in the future may be applicable to the present invention.

It should be understood by one of skill in the art that the servers and/or server cluster may reside in one or a set of physical servers and possibly across sets of redundant physical servers.

The console(s) may include one or more displays adapted to display information and graphics to the user and a user interface assembly adapted to receive input/commands from the user through a customized keypad, an indicator device (such as a mouse), a screen sensitive to touch, any other input device, known today or to be devised in the future, or any combination thereof.

The console(s), possibly in conjunction with the transaction server, through one or more data communication modules, may be adapted to display to the user data relating to the trading of F.I.'s on numerous exchanges which provide platforms for trading F.I.'s. Said data may be displayed in any form, including but not limited to graphs, charts, detailed lists or a combination thereof. The F.I. related data analyzer may be adapted to analyze said data according to any known F.I. behavioral model and/or compare different characteristics and/or behavior/trade details of different F.I.'s and display, via the console(s), said analysis and/or comparison to the user in visual form. According to some further embodiments of the present invention said display may be structured like a game (e.g. a video game).

According to some embodiments of the current invention, the transaction server, possibly in conjunction with the F.I. data analyzer, may be adapted to modify the behavior/trade details data (e.g. prices) displayed to the user so as to factor in a commission for the F.I.G.T. system's proprietor. The transaction server may be further adapted to display, via the console, said commission's rate to the user. Accordingly, every trade performed for the user by the F.I.G.T. system may inherently result in the user being charged said commission by the transaction server.

The console(s), possibly in conjunction with the transaction server, may be adapted to facilitate, through one or more data communication modules, trade of any F.I., on any one of a selection of exchanges where said F.I. is traded, for the user. Said trade may be performed by a broker and/or a trading server. The user may be allowed to input any trading instruction known today or that may be devised in the future (e.g. buy, sell, buy short, etc.). According to a further embodiment of the present invention, the console may be adapted to communicate multiple trade instructions to the transaction server in response to a single input by the user.

While trading, a user may be accorded "leverage" by the system based on: (1) the funds he/she has deposited, (2) the specific F.I. being traded, (3) the quantity of the F.I. being traded, (4) the amount risked in a specific trade and/or (5) pre-defined criteria, or by specific allowance from the administrator of the system or his/her agent. According to further embodiments of the present invention, the F.I.G.T. system may be associated with security accounts, which security accounts may be dedicated to secure greater leverage from brokers when trading F.I.'s via said brokers, i.e. augmenting the user's deposited funds in order to obtain a larger "margin".

The console(s), possibly in conjunction with the transaction server and/or the gaming server, may be further adapted to facilitate, through one or more data communication modules, one or more games for participants, in which the outcome of the game is determined according to the behavior/trade details and/or according to a characteristic (e.g. one or more digits of the numerical value) of a behavior/trade detail, of one or more F.I.'s on one or more exchanges where said F.I.'s are traded. Accordingly, each action taken by the user in any one of the games may be translated into a trade instruction or instructions relating to one or more F.I.'s.

The game may be in the form of, simulate and/or have a look and feel like known arcade games or games of chance, where the random element of a typical game of chance or the skill element of a typical arcade game, is replaced by the behavior/trade details of one or more F.I.'s on one or more exchanges where said F.I.'s are traded. Thus, for example, the game may be a simulation of Roulette where instead of the winning number being determined by the slot of the wheel into which the ball falls, the winning number is determined by a movement of the price of a specific F.I. Similarly, the game may be a simulation of blackjack where instead of drawing random cards from a shuffled deck the drawn cards are determined based on the behavior/trade details of specific F.I.'s on specific exchanges. The console(s) may display to the user a display similar to the game it is simulating, data relating to the to the determining behavior/trade detail along with an explanation of said determining factor and it's affect on the game.

The game may also be a simulation of a sport in which the outcome of the game is determined according to the behavior/trade details of one or more F.I.'s on one or more exchanges where said F.I.'s are traded. Thus, for example, the game may be a simulation of a boxing match, where each boxer represents one F.I. In this example, each boxer's behavior (e.g. movement, number and strength of punches, evasive/defensive moves, score, etc.) in the match may reflect the respective F.I.'s behavior/trade details on the exchange (e.g. every time the respective F.I.'s price goes up the Boxer punches his opponent). According to further embodiments of the present invention, the game may be a simulation of a game of strategy, e.g. chess, go, checkers, etc.

The game may also include a challenge to directly predict the future behavior/trade details of one or more F.I.'s on one or more exchanges where said F.I.'s are traded.

The console(s) may be further adapted to allow the user to select the specific F.I.'s and/or the specific behavior/trade detail that will serve to determine the result of the game. The console(s) may also allow the user select F.I. and interface/game combinations.

The duration of any game and/or the timing of the sale of a F.I. purchased by a user may be determined by the user, by a predetermined time limit, by the expiration of an option and/or when the user has reached a specific limit of gain or loss (i.e. stop loss/take profit).

The code for each of the one or more games may be stored on one or more data storage devices functionally associated with the gaming server. According to further embodiments of the present invention, the code may be stored on one or more storage devices functionally associated to the console(s).

According to some embodiments of the present invention, the transaction server or an associated module may be adapted to generate a set of automated trade orders (e.g. buy order, sell order, stop order, etc.), collectively referred to as a trading strategy, corresponding to a user input within a given gaming interface scheme. According to some embodiments of the present invention, the transaction server, possibly in conjunction with the F.I. data analyzer, may be adapted to calculate/create trading strategies that represent each possible action the user may take within any of the games. According to further embodiments of the present invention said calculation/creation may be performed by the console or may be pre-programmed into the specific game's code. According to yet further embodiments of the present invention the transaction server, possibly in conjunction with the F.I. related data analyzer and/or the trading module, may be further adapted to communicate trade instructions to brokers and/or the trading server, in accordance with said calculations, so as to build positions in the market to represent any actions made by the users on the F.I.G.T. system—i.e. to purchase, sell or otherwise trade F.I.'s so that any gains or losses accrued by the user in his use of the F.I.G.T. system will be gained or lost in the market.

According to some embodiments of the present invention, there may be provided a F.I. related data analyzer adapted to determine the odds of any future behavior/trade details, of one or more F.I.'s on one or more exchanges where said F.I.'s are traded, actually occurring. This determination may be based on a calculation performed by the F.I. related data analyzer, on a calculation performed by a third party, who specializes in financial market predictions, or a combination thereof. The transaction server may be further adapted to modify the odds so as to factor in a profit for the F.I.G.T. system's proprietor. The calculated odds may serve to assist in correlating trade orders with possible actions that may be made by a user in said games.

According to some embodiments of the present invention, the transaction server or servers may be adapted to communicate, through a communication application (e.g. VPN, etc.) or an application programming interface ("API"), via the gateway, with: (1) a broker, (2) financial institutions, (3) market data providers, (4) a trading server, (5) remote devices and/or (6) with an administration terminal.

The transaction server may also be adapted to acquire, directly, or through a third party, from market data providers, brokers and/or the trading server Behavior/Trade Details of F.I.'s on one or more exchanges which provide platforms for the trading of F.I.'s.

The transaction server may be further adapted to communicate, via the trading module, trade instructions to brokers and/or to the trading server. The trading server may be adapted to serve as a broker, i.e. provide a platform for trading in F.I.'s. For this purpose the F.I.G.T system may be associated with one or more trading accounts, maintained by a broker or directly with a F.I. exchange, which accounts may be unique to each console, unique to the F.I.G.T system, shared between a number of F.I.G.T systems or any combination thereof.

The transaction server may be further adapted to create and maintain on an associated database sub-accounts of a trading account and/or user accounts, for users, in which sub-account and/or user accounts users may deposit funds, through the payment module, using one or more of any known funding methods, possibly including online funding methods. The payment module may include a magnetic card reader, a bill/note receptacle, a coin receptacle and/or any other means of depositing/collecting funds. According to further embodiments of the present invention, there may be provided a payment module independent of the console(s), manned or unmanned, functionally associated with the transaction server, over a data network. Said sub-accounts and/or user accounts may be maintained temporarily, as long as the user is using the system (a "session"), or across multiple sessions.

According to some embodiments of the present invention, the transaction server may be adapted to communicate, over a data network, with financial institutions, including credit providers, to facilitate transactions. The transaction server may be further adapted to credit or debit the user's account based on his activity on the F.I.G.T. system.

The transaction server may be further adapted to payout the user a remaining balance in his/her account in any known form of payment, either directly or via an agent, including but not limited to transferring the funds to the user's bank/credit/trading account with an external financial institution or credit provider.

The administration terminal may be adapted to allow an administrator of one or more F.I.G.T. systems to control and/or modify the functions of any of the other components of the F.I.G.T. systems and may be further adapted to receive from any of the other components of the F.I.G.T. systems data relating to their function and to display this data to said administrator.

The control terminal may be adapted to allow a local/venue administrator of a F.I.G.T. system to control and/or modify some of the functions of any of the other components of the F.I.G.T. system and may be further adapted to receive from any of the other components of the F.I.G.T. system data relating to their function and to display this data to said local/venue administrator. The administration terminal may be adapted to define and/or modify the functions the control terminal is authorized to control and/or modify.

The transaction server may be further adapted to calculate the taxes owed by the user for any profits gained while trading/gaming on the F.I.G.T. system and may be even further adapted to withhold these taxes from the user's payout.

The console(s) may be further adapted to print a written receipt for the user depicting the details of his activity on the F.I.G.T. system, including details of deposits, payouts, withheld taxes and so on.

According to some further embodiments of the present invention, there may be provided a console including multiple displays, payment modules and user interface assemblies that may be adapted to allow multiple users to participate in a single game. According to yet further embodiments of the present invention, consoles may be collocated to form gaming arenas which may be supervised by an agent of the administrator of the system. Additionally a control terminal may be accordingly collocated.

According to some further embodiments of the present invention, the transaction server may be adapted to display to users upon a remote device a display similar to the one displayed upon the console and may be further adapted to allow users to perform via a remote device any action that may be performed via the console's interface, i.e. the remote device will serve as a remote console, creating what is known in the art as a cross platform.

According to further embodiments of the present invention, instead of the customary method of allowing the user to select the amount of the investment, the console may be adapted to allow the user to select the amount to he/she will profit or lose for each unit of movement in the behavior/trade detail of the F.I. being traded. Subsequently, the transaction server may translate the user's selection to an appropriate amount to be invested.

It should be understood by one of skill in the art that some of the functions described as being performed by a specific component of the system may be performed by a different component of the system in other embodiments of this invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6 (A, B & C) are exemplary LED candle graphs in accordance with some embodiments of the present invention;

DETAILED DESCRIPTION

Figure 1:
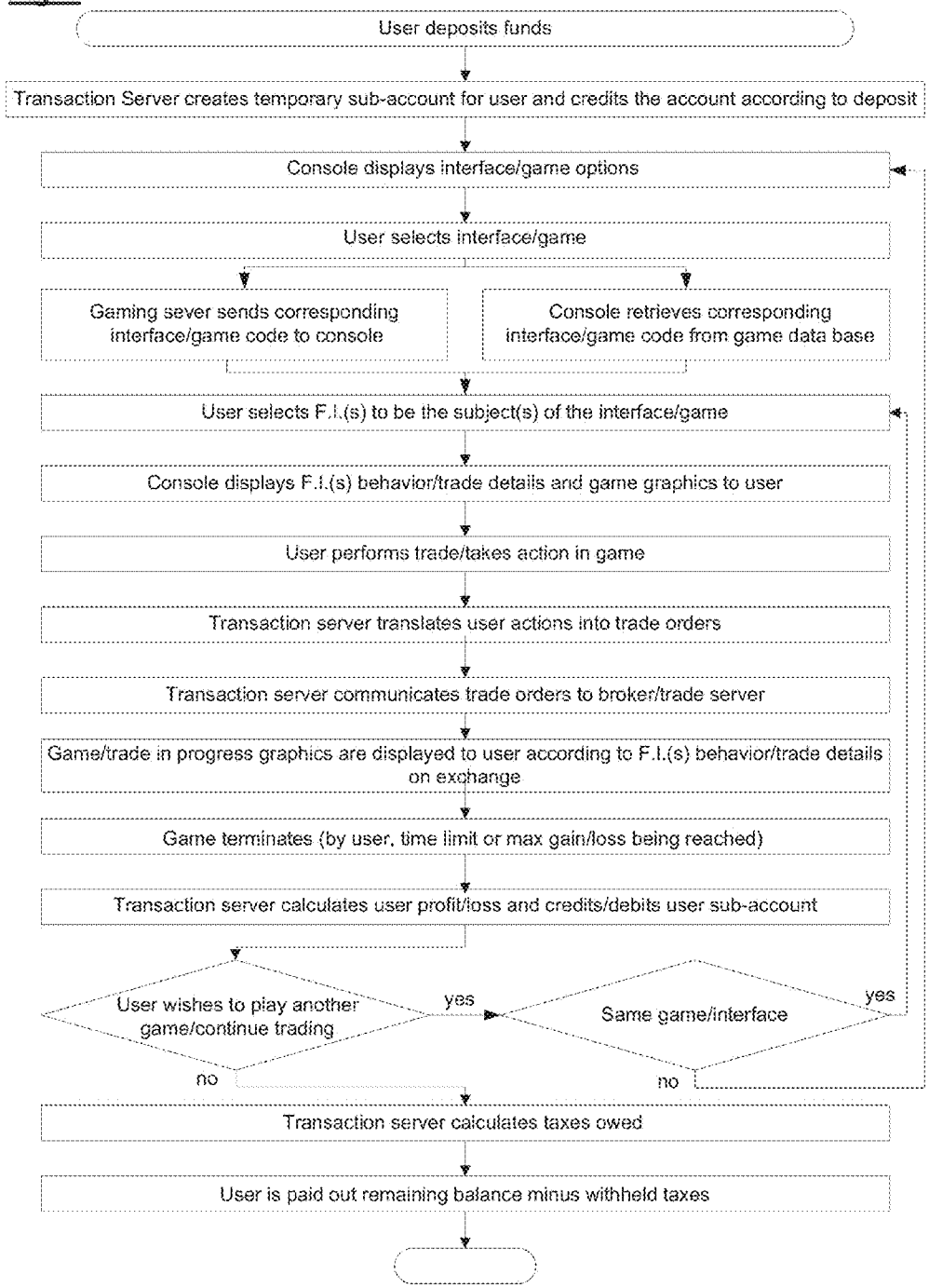
FIG. 1 is a flowchart including steps of an exemplary online method for providing a console and interface to a financial market trading system or to a financial market based gaming system in accordance with some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. The term server may refer to a single server or to a functionally associated cluster of servers.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Terms in this application relating to distributed data networking, such as send or receive, may be interpreted in reference to Internet protocol suite, which is a set of communications protocols that implement the protocol stack on which the Internet and most commercial networks run. It has also been referred to as the TCP/IP protocol suite, which is named after two of the most important protocols in it: the Transmission Control Protocol (TCP) and the Internet Protocol (IP), which were also the first two networking protocols defined. Today's IP networking represents a synthesis of two developments that began in the 1970s, namely LANs (Local Area Networks) and the Internet, both of which have revolutionized computing.

The Internet Protocol suite—like many protocol suites—can be viewed as a set of layers. Each layer solves a set of problems involving the transmission of data, and provides a well-defined service to the upper layer protocols based on using services from some lower layers. Upper layers are logically closer to the user and deal with more abstract data, relying on lower layer protocols to translate data into forms that can eventually be physically transmitted. The TCP/IP reference model consists of four layers.

Layers in the Internet Protocol Suite

The IP suite uses encapsulation to provide abstraction of protocols and services. Generally a protocol at a higher level uses a protocol at a lower level to help accomplish its aims. The Internet protocol stack has never been altered, by the IETF, from the four layers defined in RFC 1122. The IETF makes no effort to follow the seven-layer OSI model and does not refer to it in standards-track protocol specifications and other architectural documents.

| 4. Application | DNS, TFTP, TLS/SSL, FTP, Gopher, HTTP, IMAP, IRC, NNTP, POP3, SIP, SMTP, SNMP, SSH, TELNET, ECHO, RTP, PNRP, rlogin, ENRP Routing protocols like BGP, which for a variety of reasons run over TCP, may also be considered part of the application or network layer. |
|---|---|

| -continued | |
|---|---|
| 3. Transport | TCP, UDP, DCCP, SCTP, IL, RUDP |
| 2. Internet | Routing protocols like OSPF, which run over IP, are also to be considered part of the network layer, as they provide path selection. ICMP and IGMP run over IP and are considered part of the network layer, as they provide control information.<br>IP (IPv4, IPv6)<br>ARP and RARP operate underneath IP but above the link layer so they belong somewhere in between. |
| 1. Network access | Ethernet, Wi-Fi, token ring, PPP, SLIP, FDDI, ATM, Frame Relay, SMDS |

It should be understood that any topology, technology and/or standard for computer networking (e.g. mesh networks, infiniband connections, RDMA, etc.), known today or to be devised in the future, may be applicable to the present invention.

The present invention is a console, system and method for providing an interface to a financial market trading system or to a financial market based gaming system. The invention enables the trader to trade on financial markets using an interface simulating known and popular games from the world of sports, arcade, games of chance, strategic games and the like. Thus, the trader may have an enjoyable and exciting experience whilst trading. Said Game simulations, due to their association with financial markets, are calculated and not random. According to some of the teachings of the invention, the random and/or skill elements of the simulated games are replaced by the behavior/trade details of traded financial instruments and all of their derivatives. According to some further embodiments of the present invention, graphic schemes imitating the simulated games contribute even further to the traders' experience.

Figure 2:
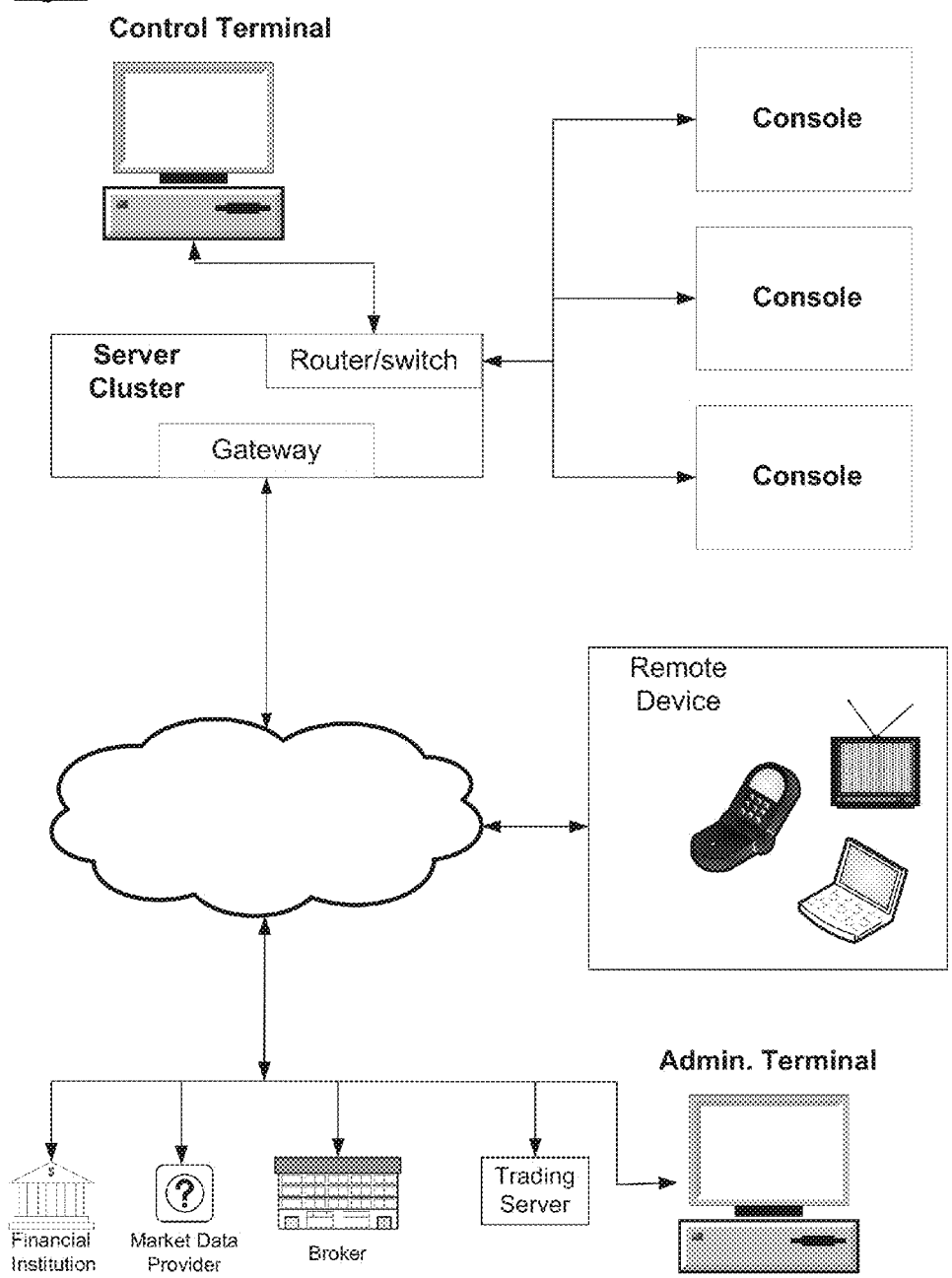
FIG. 2 is a functional block diagram illustrating the functional blocks of an exemplary system for providing a console and interface to a financial market trading system or to a financial market based gaming system in accordance with some embodiments of the present invention.
Figure 3:
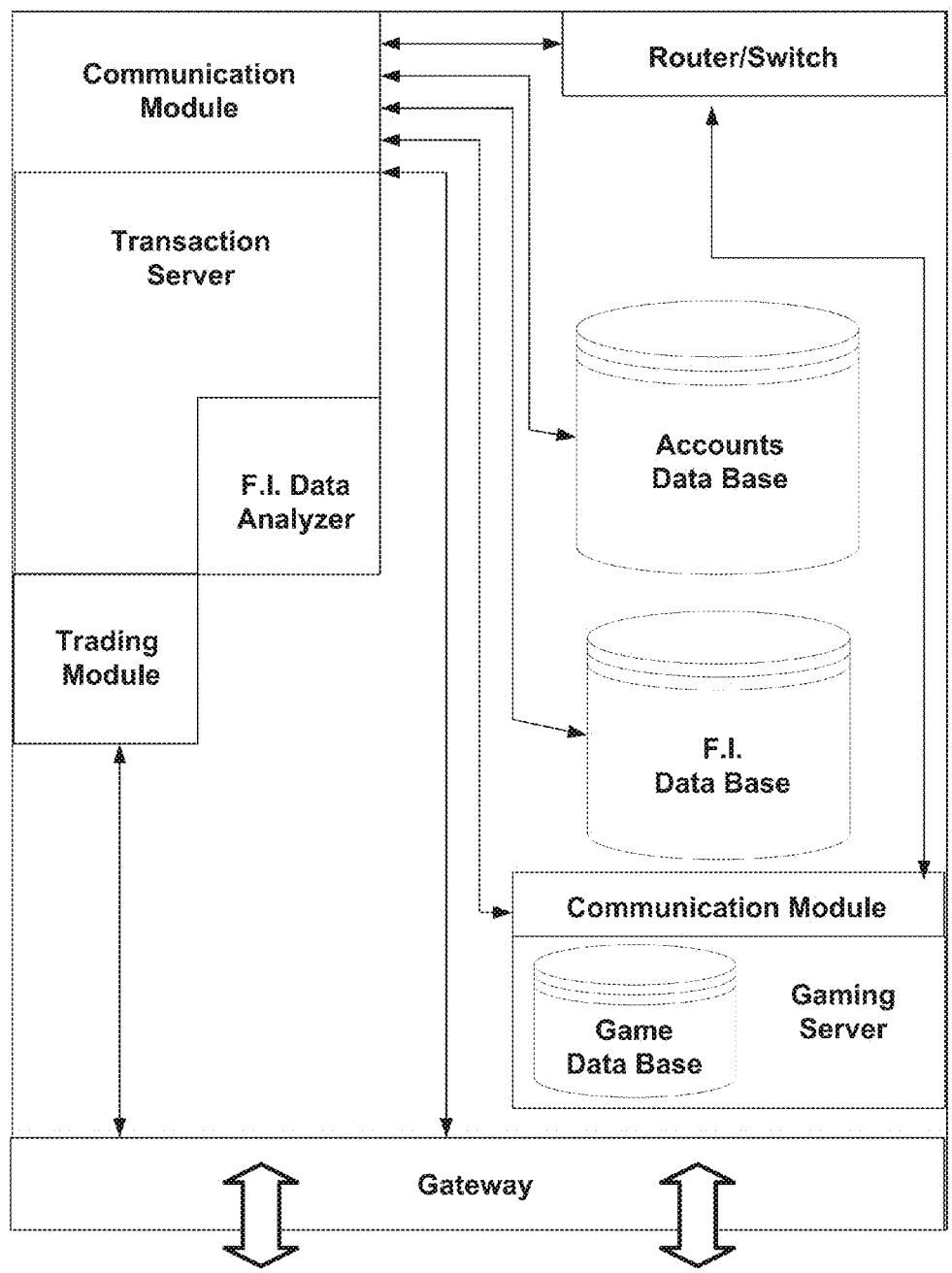
FIG. 3 is a functional block diagram illustrating the functional blocks of an exemplary server cluster in accordance with some embodiments of the present invention.
Figure 4:
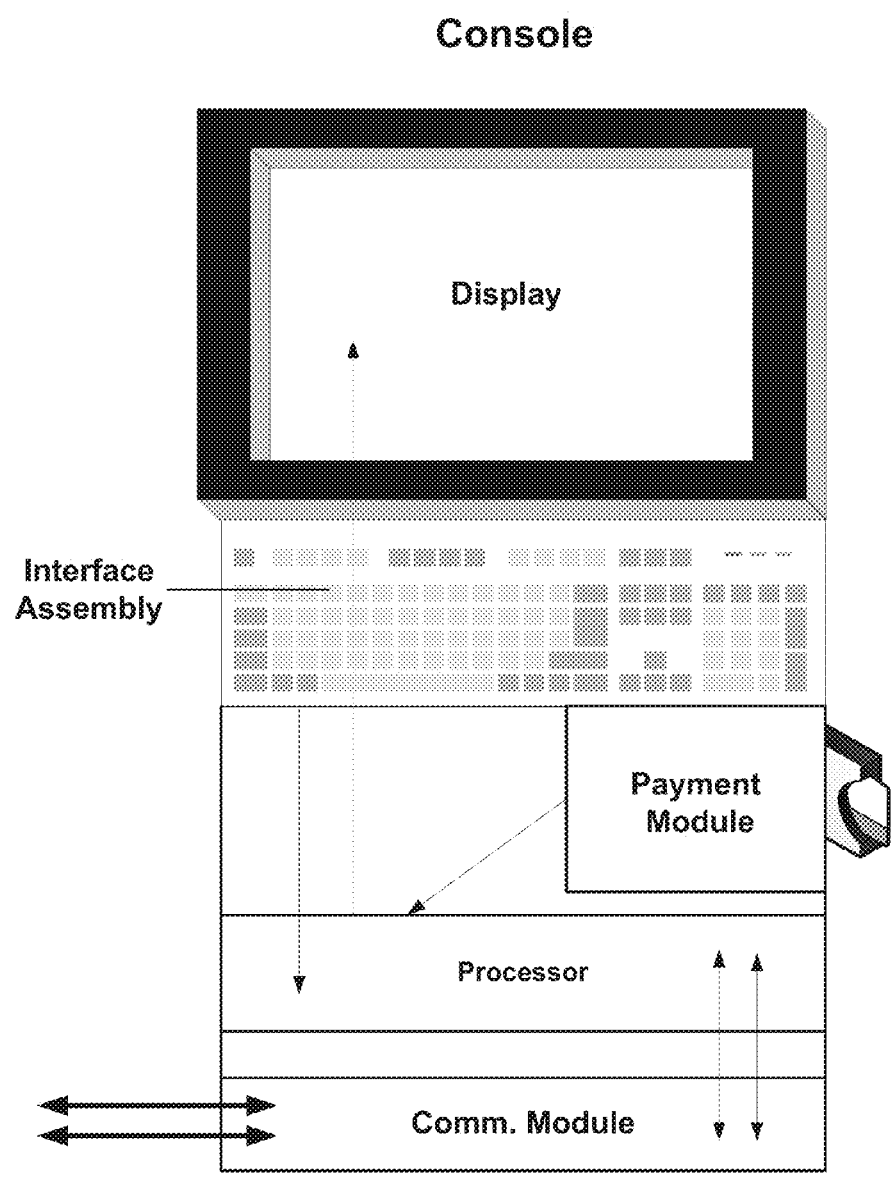
FIG. 4 is a functional block diagram illustrating the functional blocks of an exemplary console in accordance with some embodiments of the present invention.
Figure 5:
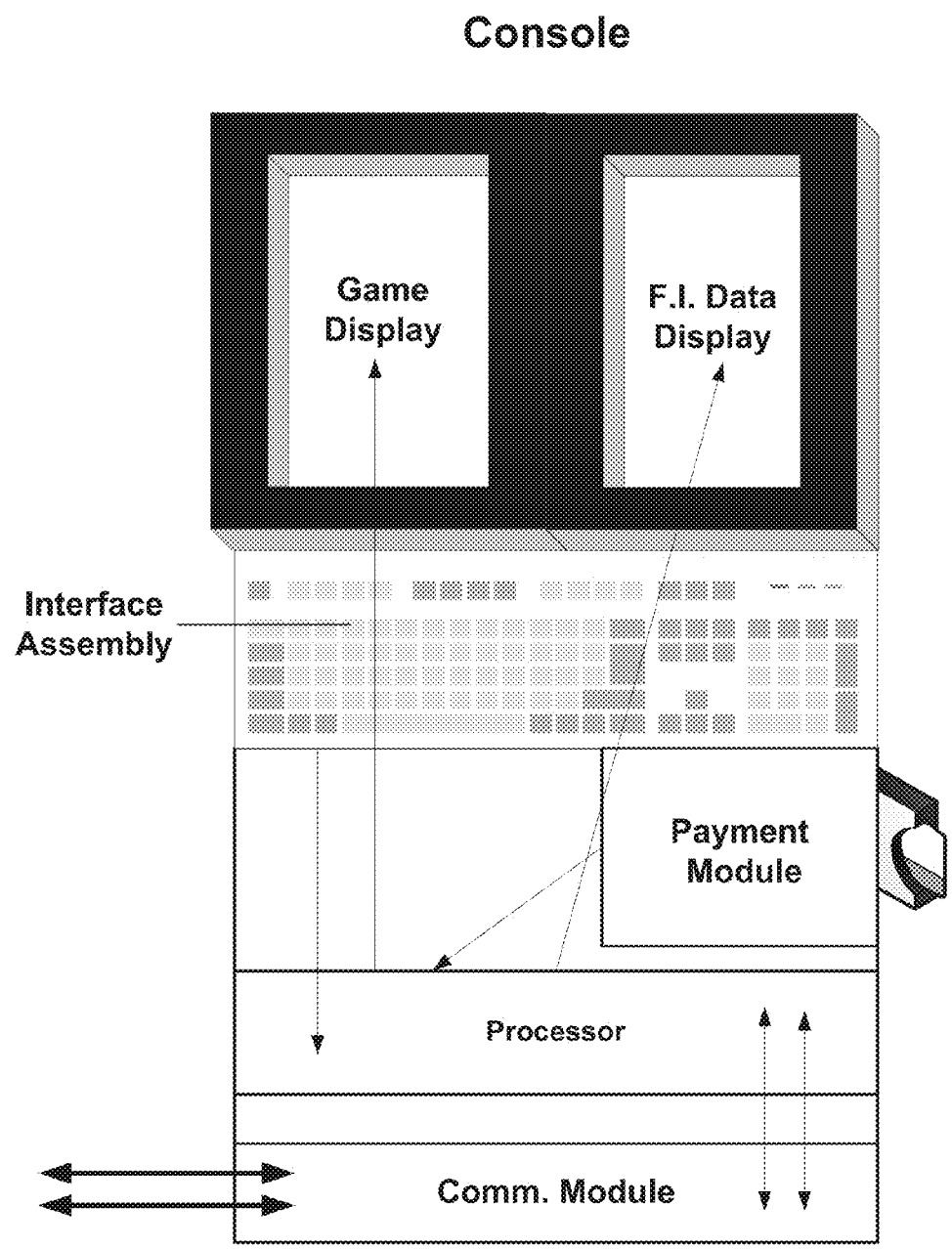
FIG. 5 is a functional block diagram illustrating the functional blocks of an exemplary console in accordance with some further embodiments of the present invention.

According to some embodiments of the present invention, there may be provided one or more financial markets related (gaming or trading) consoles (exemplified in FIGS. 4 & 5), which one or more consoles may be networked, directly or through a distributed network, with a server or server cluster (exemplified in FIG. 3) including at least one transaction server. According to some embodiments of the present invention, the server or server cluster may be integral with the console. According to further embodiments of the present invention the transaction server and/or server cluster may be further networked, directly or through a distributed network, with a control terminal(s), an administration terminal, remote devices, brokers, financial institutions, market data providers and/or a trading server. (an exemplary functional block diagram of the system as a whole according to some embodiments of the present invention can be seen in FIG. 2).

According to some embodiments of the present invention, the financial markets related (gaming or trading) console(s) may include one or more displays, one or more user interface assemblies, one or more payment receipt modules (i.e. cash, credit card, tokens, other cards and/or any other known payment method), a communication module and a processor adapted to regulate the operation of all the console's constituent components in the context of a F.I. associated trading/gaming environment. The processor may be functionally associated with the communication module (an exemplary functional block diagram of a console according to some embodiments of the present invention can be seen in FIGS. 4 & 5). The communication module may be adapted to communicate, over a data network, with one or more servers, including a transaction server, a gaming server and/or any other server types functionally relevant to F.I. based trading or gaming.

According to some embodiments of the present invention the server cluster may include a transaction server, a router/switch, an accounts database, a F.I. related data database, a game data base, a trading module, a F.I. related data analyzer, a gateway, a gaming server and/or any other server types functionally relevant to F.I. based trading or gaming. The servers within the cluster may each be functionally associated with a communication module. Any and all computational architecture known today or to be devised in the future may be applicable to the present invention.

It should be understood by one of skill in the art that the servers and/or server cluster may reside in one or a set of physical servers and possibly across sets of redundant physical servers.

The console(s) may include one or more displays adapted to display information and graphics to the user and a user interface assembly adapted to receive input/commands from the user through a customized keypad, an indicator device (such as a mouse), a screen sensitive to touch, any other input device, known today or to be devised in the future, or any combination thereof.

The console(s), possibly in conjunction with the transaction server, through one or more data communication modules, may be adapted to display to the user data relating to the trading of F.I.'s on numerous exchanges which provide platforms for trading F.I.'s. Said data may be displayed in any form, including but not limited to graphs, charts, detailed lists or a combination thereof. The F.I. related data analyzer may be adapted to analyze said data according to any known F.I. behavioral model and/or compare different characteristics and/or behavior/trade details of different F.I.'s and display, via the console(s), said analysis and/or comparison to the user in visual form. According to some further embodiments of the present invention said display may be structured like a game (e.g. a video game). According to further embodiments of the present invention, said F.I. related data, analysis and/or comparisons may be displayed on a separate display, included in the console or located within view of one or more consoles and/or any combination thereof.

According to some embodiments of the present invention, the console may display a "LED Candle" graph which provides information relating to the price movement of a specific F.I. in relation to specified time intervals, as seen in FIGS. 6A, 6B and 6C. In a LED Candle graph each time interval may be represented by a column of LED's. Each column may consist of a series of LED's stretching from the lowest price the specific F.I. reached during the specific time interval to the highest, wherein the LED's located between the price of the F.I. at the beginning of the time interval (i.e. "opening price") to the price at the end of the interval (i.e. "closing price") are lit. The color of the lit LED's may depend on the overall movement of the price within the specified time interval, wherein if the closing price is higher than the opening price (i.e. the price went up overall), the lit LED's may be blue (as seen in FIG. 6A) and if the closing price is lower than the opening price (i.e. the price went down overall), the lit LED's may be red (as seen in FIG. 6B). The remaining LED's in the column may appear shaded but visible. The LED Candle graph may consist of a series of such columns (see FIG. 6C).

According to some embodiments of the current invention, the transaction server, possibly in conjunction with the F.I. data analyzer, may be adapted to modify the behavior/trade details data (e.g. prices) displayed to the user so as to factor in a commission for the F.I.G.T. system's proprietor. The transaction server may be further adapted to display, via the console, said commission's rate to the user. Accordingly, every trade performed for the user by the F.I.G.T. system may inherently result in the user being charged said commission by the transaction server. For example, the price of a F.I. being purchased/sold may be presented to the user 0.0002 units higher/lower than the actual price on the relevant market. Accordingly, in this example, when the transaction server performs the trade for the user there will be a difference equal to (0.0002)×(the number of units purchased/sold) between the amount the user is charged/credited and the actual cost/consideration paid for the F.I. This difference may be retained by the system as the F.I.G.T. system's proprietor's commission. Noticeably, every trade will result in two commissions, one during the purchase of the F.I. and one during the sale.

The console(s), possibly in conjunction with the transaction server, may be adapted to facilitate, through one or more data communication modules, trade of any F.I., on any one of a selection of exchanges where said F.I. is traded, for the user. Said trade may be performed by a broker and/or a trading server. The user may be allowed to input any trading instruction known today or that may be devised in the future (e.g. buy, sell, buy short, etc.). According to a further embodiment of the present invention, the console may be adapted to communicate multiple trade instructions to the transaction server in response to a single input by the user, e.g. the user may be able to simultaneously purchase one currency, sell another currency and purchase an exotic option with one press of a button.

While trading, a user may be accorded "leverage" by the system based on: (1) the funds he/she has deposited, (2) the specific F.I. being traded, (3) the quantity of the F.I. being traded, (4) the amount risked in a specific trade and/or (5) pre-defined criteria, or by specific allowance from the administrator of the system or his/her agent. According to further embodiments of the present invention, the F.I.G.T. system may be associated with security accounts, which security accounts may be dedicated to secure greater leverage from brokers when trading F.I.'s via said brokers, i.e. augmenting the user's deposited funds in order to obtain a larger "margin". Assume, for example, that a broker would normally allow a trader to purchase gold for 100$ for every 1$ he/she deposits in his/her sub-account, i.e. 1:100 leverage. Therefore, a user who has deposited 50$ would be able to purchase gold for up to 5,000$. Let us further assume, however, that the F.I.G.T. system maintains, for this purpose, a large security account with the broker, say 50,000$. In this situation the user of the F.I.G.T. system may be allowed to purchase gold for 200$ for every 1$ he/she deposits in his/her sub-account, i.e. 1:200 leverage. Thus, a user who has deposited 50$ would be able to purchase gold for up to 10,000$, with both his 50$ and 50$ of the F.I.G.T. system's security account serving as security for the broker, who is then still only allowing 1:100 leverage. In this fashion one security account can serve to augment the leverage of many users simultaneously. By maintaining said security account the F.I.G.T. system may be able to offer users greater leverage than is customary in the market.

The console(s), possibly in conjunction with the transaction server and/or the gaming server, may be further adapted to facilitate, through one or more data communication modules, one or more games for participants, in which the outcome of the game is determined according to the behavior/trade details and/or according to a characteristic (e.g. one or more digits of the numerical value) of a behavior/trade detail, of one or more F.I.'s on one or more exchanges where said F.I.'s are traded. Accordingly, each action taken by the user in any one of the games may be translated into a trade instruction or instructions relating to one or more F.I.'s.

The game may be in the form of, simulate and/or have a look and feel like known arcade games or games of chance, where the random element of a typical game of chance or the skill element of a typical arcade game, is replaced by the behavior/trade details of one or more F.I.'s on one or more exchanges where said F.I.'s are traded. Thus, for example, the game may be a simulation of Roulette where instead of the winning number being determined by the slot of the wheel into which the ball falls, the winning number is determined by a movement of the price of a specific F.I. Similarly, the game may be a simulation of blackjack where instead of drawing random cards from a shuffled deck the drawn cards are determined based on the behavior/trade details of specific F.I.'s on specific exchanges. The console(s) may display to the user a display similar to the game it is simulating, data relating to the to the determining behavior/trade detail along with an explanation of said determining factor and it's affect on the game.

The game may also be a simulation of a sport in which the outcome of the game is determined according to the behavior/trade details of one or more F.I.'s on one or more exchanges where said F.I.'s are traded. Thus, for example, the game may be a simulation of a boxing match, where each boxer represents one F.I. In this example, each boxer's behavior (e.g. movement, number and strength of punches, evasive/defensive moves, score, etc.) in the match may reflect the respective F.I.'s behavior/trade details on the exchange (e.g. every time the respective F.I.'s price goes up the Boxer punches his opponent). According to further embodiments of the present invention, the game may be a simulation of a game of strategy, e.g. chess, go, checkers, etc.

The game may also include a challenge to directly predict the future behavior/trade details of one or more F.I.'s on one or more exchanges where said F.I.'s are traded.

The console(s) may be further adapted to allow the user to select the specific F.I.'s and/or the specific behavior/trade detail that will serve to determine the result of the game. The console(s) may also allow the user select F.I. and interface/game combinations. Behavior/trade details of a F.I. may refer to any parameter relating to the trade of a given F.I. on a given exchange. For example, if the F.I. is a stock then said behavior/trade details may be a price of that stock during at least one moment within a certain short-term period, a certain digit of said price, a combination of two or more digits of said price, a difference between a price of that stock at a certain moment within the short-term period to that stock's price during another moment, a statistical value representing the behavior of that stock, a volume of trade of that certain stock, an amount of stock transactions, a change of the price of the stock (such as by points or percentage), a trend in the movement of the price of the stock (such as Up/Down/No change), a spread between ask and bid, a value or change pertaining to categories of stocks (e.g. technology, real estate, etc.) and/or any other value relating to the trade of F.I.'s.

For example, if the game being simulated is roulette, the determining behavior/trade detail may be the movement of a specific F.I.'s price during a predetermined time period. In this example, each number on the roulette table, i.e. 0-36, may represent a specific possible movement of said price during the specified time period, wherein 1-18 may represent upward movements of said price, 19-36 may represent downward movements of said price and 0 may represent no movement. The determination which number, between 1-18 in the case of upward movement or which number between 19-36 in the case of downward movement, is represented by said movement may be dependent on the magnitude of the price change. For example, each $1/100$ of a percentile of price change of the relevant F.I. may change the representative number by one, i.e. if the price moved up during the specified time period by 1/100 of a percent the number may be 1, 2/100 of a percentile may be 2, 3/100 of a percent may be 3 and so on, whereas if the price moved down during the specified time period by 1/100 of a percent the number may be 19, 2/100 of a percent may be 20 and so on. In this fashion the winning number of a financial markets based game simulating roulette according to some embodiments of the present invention may be determined according to the price change of a specific F.I. during a pre-determined time period. In a similar fashion other behavior/trade details of a F.I., as listed above, may be used for this purpose and, according to further embodiments of the present invention, the outcome of other types of games may be determined.

The duration of any game and/or the timing of the sale of a F.I. purchased by a user may be determined by the user, by a predetermined time limit, by the expiration of an option and/or when the user has reached a specific limit of gain or loss (i.e. stop-loss/take-profit).

The code for each of the one or more games may be stored on one or more data storage devices functionally associated with the gaming server. According to further embodiments of the present invention, the code may be stored on one or more storage devices functionally associated to the console(s).

According to some embodiments of the present invention, the transaction server or an associated module may be adapted to generate a set of automated trade orders (e.g. buy order, sell order, stop order, etc.), collectively referred to as a trading strategy, corresponding to a user input within a given gaming interface scheme. For example, in the Roulette simulation example illustrated above in paragraph 74 the choice of a specific number or group of numbers by a user may be translated into one or more Barrier type options. According to some embodiments of the present invention, the transaction server, possibly in conjunction with the F.I. data analyzer, may be adapted to calculate/create trading strategies that represent each possible action the user may take within any of the games. According to further embodiments of the present invention said calculation/creation may be performed by the console or may be pre-programmed into the specific game's code. According to yet further embodiments of the present invention the transaction server, possibly in conjunction with the F.I. related data analyzer and/or the trading module, may be further adapted to communicate trade instructions to brokers and/or the trading server, in accordance with said calculations, so as to build positions in the market to represent any actions made by the users on the F.I.G.T. system—i.e. to purchase, sell or otherwise trade F.I.'s so that any gains or losses accrued by the user in his use of the F.I.G.T. system will be gained or lost in the market.

According to some embodiments of the present invention, in order to properly represent user actions on the F.I.G.T. system in trade exotic options known in the art may be used, examples of which are:

1. Digital—wherein the payoff is fixed after the underlying F.I. exceeds a predetermined threshold or strike price. The value of the payoff is determined at the onset of the contract and does not depend on the magnitude by which the price of the underlying changes, so long as the price is beyond the pre-determined threshhold.
2. Asian—wherein the payoff depends on the average price of the underlying F.I. over a certain period of time as opposed to at maturity.
3. Barrier—wherein the payoff depends on whether or not the F.I.'s price ends up within a pre-determined range.
4. Asset-or-Nothing—wherein the payoff is equal to the price of the F.I. if the price of the F.I. is higher (or in other version: lower) than the strike price, while otherwise the payoff is zero.
5. Cash-or-Nothing—wherein the payoff is set to a specified fixed price if a final price of the F.I. is higher (or in other version: lower) than the strike price; while otherwise the payoff is set to zero.
6. Knock-In—A latent trade that begins to function as a normal trade ("knocks in") only once a certain price level is reached before expiration.
7. Knock-Out—A trade that is cancelled once a certain price is met, so if the price is reached it is as if the trade never took place.
8. One-Touch—wherein the trader is given the payout once the price of the F.I. reaches or surpasses a predetermined barrier. This type of trade allows the trader to set the value of the barrier, the time of expiration and the payout to be received once the barrier is broken. Only two outcomes are possible with this type of trade: either the barrier is breached and the trader collects the full payout agreed upon at the outset of the trade, or the barrier is not breached and the trader loses the full premium. It should be noted that this type of trade is useful for traders who believe that the price of the F.I. will exceed a certain level in the future, but who are not sure that the higher price level is sustainable. Because a one touch trade only has one barrier level, it is generally slightly less expensive than a double one touch.
9. Double One-Touch—wherein the trader is given an agreed upon payout if the price of the F.I. reaches or passes one of two predetermined barrier levels, one of which is lower than the current price and one of which is higher. A trader is able to determine the position of both barriers, the time to expiration, and the payout to be received if the price does rise above one of the barriers. Either one of the barrier levels must be breached prior to expiration for the trade to become profitable and for the buyer to receive the payout. If neither barrier level is breached prior to expiration, the trade expires worthless and the player loses all the premium. This type of trade is useful for traders who believe the price of the F.I. will undergo a large price movement, but who are unsure of the direction.
10. Double No-Touch—wherein the trader is given an agreed upon payout if the price of the F.I. does not reach or pass one of two predetermined barrier levels, one of which is lower than the current price and one of which is higher. A trader performing this type of trade pays a premium and in turn receives the right to choose the position of the barriers, the time to expiration, and the payout to be received if the price fails to breach either barrier. The maximum possible loss is the cost of setting up the trade. A double no-touch trade is the opposite of a double one-touch trade. This type of trade is useful for a trader who believes that the price of the F.I. will remain range bounded over a certain period of time.
11. Up-and-out: wherein a spot price starts below the barrier level and has to move up for the trade to be knocked out.
12. Down-and-out: wherein a spot price starts above the barrier level and has to move down for the trade to become null and void.
13. Up-and-in: wherein spot price starts below the barrier level and has to move up for the trade to be activated.

14. Down-and-in: wherein spot price starts above the barrier level and has to move down for the trade to be activated.
15. Ladder—wherein locks-in gains once the underlying F.I. reaches predetermined price levels or "rungs", guaranteeing some profit even if the F.I. falls back below these levels before the trade expires.
16. Lookback—wherein traders are allowed to "look back" at the underlying prices occurring over the life of the trade and then trade based on the F.I.'s optimal value. This type of trade reduces uncertainties associated with the timing of market entry. There are two types of lookback trades: a fixed lookback trade, wherein the trade's strike price is fixed at purchase, though the trade is not executed at the market price: in the case of a call, the trader can look back over the life of the trade and choose to execute the trade at the point when the F.I. was priced at its highest over the life of the trade; and a floating lookback trade, wherein the trade's strike price is fixed at maturity. While lookback trades are appealing to traders, they can be expensive and are also considered to be quite speculative.
17. Shout—wherein the trader is allowed to lock in a defined profit while maintaining the right to continue participating in gains without a loss of locked-in monies. "Shout" can be structured so that traders have more than one opportunity to "shout" or lock in profits. This allows traders to continue to benefit from positive market movements without the possibility of losing already locked-in profits.
18. Quantity-Adjusting ("Quanto")—A cash-settled, cross-currency derivative in which the F.I. is denominated in a currency other than the currency in which the trade is settled. Traders will trade using Quantos when they believe that the F.I. will do well in another country but fear that country's currency will not.

It is noted that those trades are also known as "strike" trades.

According to some further embodiments of the present invention, other types of trade orders may be used in order to properly represent, in trade of F.I.(s), user actions within any given game including but not limited to: vanille, binary, exotic, American or European style, Theta, Gamma, Beta, Delta, Vega/kappa, Roho, Omega and/or any combination of the above examples.

According to some embodiments of the present invention, there may be provided a F.I. related data analyzer adapted to determine the odds of any future behavior/trade details, of one or more F.I.'s on one or more exchanges where said F.I.'s are traded, actually occurring. This determination may be based on a calculation performed by the F.I. related data analyzer, on a calculation performed by a third party, who specializes in financial market predictions, or a combination thereof. The transaction server may be further adapted to modify the odds so as to factor in a profit for the F.I.G.T. system's proprietor. The calculated odds may serve to assist in correlating trade orders with possible actions that may be made by a user in said games.

According to some embodiments of the present invention, the transaction server or servers may be adapted to communicate, through a communication application (e.g. VPN, etc.) or an application programming interface ("API"), via the gateway, with: (1) a broker, (2) financial institutions, (3) market data providers, (4) a trading server, (5) remote devices and/or (6) with an administration terminal.

The transaction server may also be adapted to acquire, directly, or through a third party, from market data providers, brokers and/or the trading server Behavior/Trade Details of F.I.'s on one or more exchanges which provide platforms for the trading of F.I.'s.

The transaction server may be further adapted to communicate, via the trading module, trade instructions to brokers and/or to the trading server. The trading server may be adapted to serve as a broker, i.e. provide a platform for trading in F.I.'s. For this purpose the F.I.G.T system may be associated with one or more trading accounts, maintained by a broker or directly with a F.I. exchange, which accounts may be unique to each console, unique to the F.I.G.T system, shared between a number of F.I.G.T systems or any combination thereof.

It is further noted that trades made in accordance with the teachings of this invention may be implemented in different ways, such as, but not limited to, trading on the F.I.G.T. system without actually trading on the market; building positions on the market that represent the trader actions within one of the simulated games, ordinary trading on the market through unique, arcade style visual representations and/or any combination thereof.

The transaction server may be further adapted to create and maintain on an associated database sub-accounts of a trading account and/or user accounts, for users, in which sub-account and/or user accounts users may deposit funds, through the payment module, using one or more of any known funding methods, possibly including online funding methods. The payment module may include a magnetic card reader, a bill/note receptacle, a coin receptacle and/or any other means of depositing/collecting funds. According to further embodiments of the present invention, there may be provided a payment module independent of the console(s), manned or unmanned, functionally associated with the transaction server, over a data network. Said sub-accounts and/or user accounts may be maintained temporarily, as long as the user is using the system (a "session"), or across multiple sessions.

According to some embodiments of the present invention, the transaction server may be adapted to communicate, over a data network, with financial institutions, including credit providers, to facilitate transactions. The transaction server may be further adapted to credit or debit the user's account based on his activity on the F.I.G.T. system.

The transaction server may be further adapted to payout the user a remaining balance in his/her account in any known form of payment, either directly or via an agent, including but not limited to transferring the funds to the user's bank/credit/trading account with an external financial institution or credit provider.

The administration terminal may be adapted to allow an administrator of one or more F.I.G.T. systems to control and/or modify the functions of any of the other components of the F.I.G.T. systems and may be further adapted to receive from any of the other components of the F.I.G.T. systems data relating to their function and to display this data to said administrator.

The control terminal may be adapted to allow a local/venue administrator of a F.I.G.T. system to control and/or modify some of the functions of any of the other components of the F.I.G.T. system and may be further adapted to receive from any of the other components of the F.I.G.T. system data relating to their function and to display this data to said local/venue administrator. The administration terminal may be adapted to define and/or modify the functions the control terminal is authorized to control and/or modify.

The transaction server may be further adapted to calculate the taxes owed by the user for any profits gained while trading/gaming on the F.I.G.T. system and may be even further adapted to withhold these taxes from the user's payout.

The console(s) may be further adapted to print a written receipt for the user depicting the details of his activity on the F.I.G.T. system, including details of deposits, payouts, withheld taxes and so on.

According to some further embodiments of the present invention, there may be provided a console including multiple displays, payment modules and user interface assemblies that may be adapted to allow multiple users to participate in a single game. According to yet further embodiments of the present invention, consoles may be collocated to form gaming arenas which may be supervised by an agent of the administrator of the system. Additionally a control terminal may be accordingly collocated.

According to some further embodiments of the present invention, the transaction server may be adapted to display to users upon a remote device a display similar to the one displayed upon the console and may be further adapted to allow users to perform via a remote device any action that may be performed via the console's interface, i.e. the remote device will serve as a remote console, creating what is known in the art as a cross platform.

In further embodiments, this invention may be implemented on different platforms, such as, but not limited to, a personal computer (PC), an Internet website, a cellular phone, an Interactive television and/or any other remote device.

According to further embodiments of the present invention, instead of the customary method of allowing the user to select the amount of the investment, the console may be adapted to allow the user to select the amount he/she will profit or lose for each unit of change in the behavior/trade detail of the F.I. being traded. Subsequently, the transaction server may translate the user's selection to an appropriate amount to be invested.

Specific Interface Examples

The following are illustrative examples of specific embodiments of interfaces associated with the present invention:

Trading Interface—this interface may be adapted to allow the user to trade in foreign currencies through an interface that resembles an arcade game. As with other foreign exchange interfaces, any combination of pairs of currencies may be supported/traded.

Figure 7:
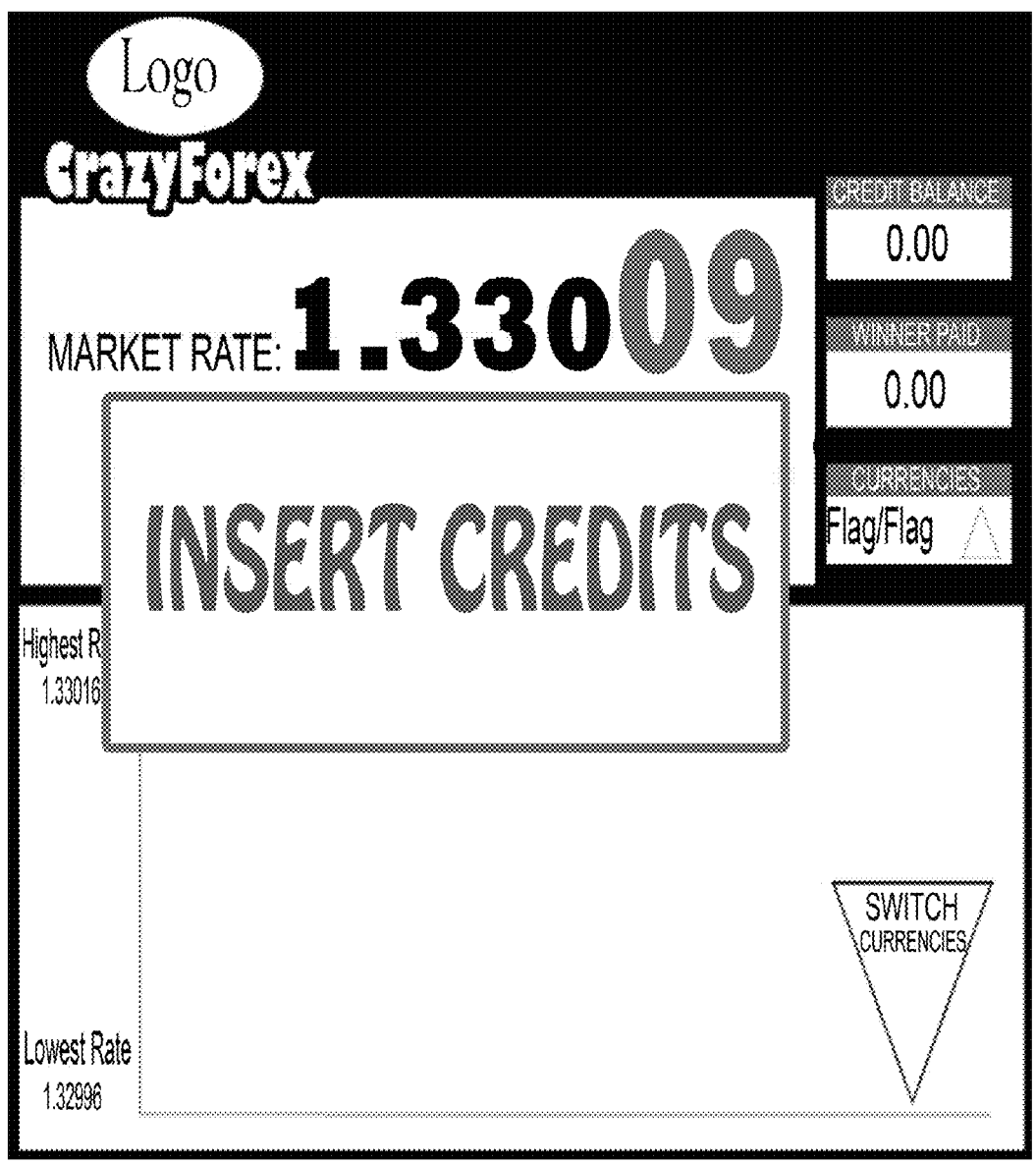
FIGS. 7, 8 & 9 are exemplary screenshots of console displays in accordance with some embodiments of the present invention and further described below.

Before the user has deposited funds, or after the deposited funds have been paid out or lost, the interface may be in its "idle" state, illustrated in FIG. 7. The screen may contain some or all of the following elements:
1. "Credit Balance" section—displays the user's current credit balance. Will initially be 0 since no funds have been deposited yet.
2. "Winner Paid" section—displays the previous user's profit from his/her last trade. If the user lost all his risked credits on the last trade (Stop Loss reached) or the machine has just been reset and there was no last user, it will display 0.
3. "Currencies" section—displays the current pair of currencies and if the trade is "Buy" or "Sell". Instead of showing the traditional terms "Buy" or "Sell", an arrow pointing up or down may be displayed.
4. "Commission" section—displays to the user the commission's rate for the selected pair of currencies.
5. "Market Rate" section—displays the current exchange rate in the market according to the selected pair of currencies. There may be an indication of current changes in the market beside the rate. If the exchange rate is increasing, a green arrow pointing up may appear beside the rate. If the exchange rate is decreasing, a red arrow pointing down may appear beside the rate.
6. "Graph" section—displays to the user a styled graph of the last X quotes for the current pair of currencies.
7. "Insert Credits" section—displays to the user a constant message that invites him/her to deposit funds into the machine in order to start trading.

The only action the user may execute in the idle state, without depositing funds, is to switch the current pair of currencies being displayed. This may be accomplished by the push of a button on the console interface assembly.

Figure 8:
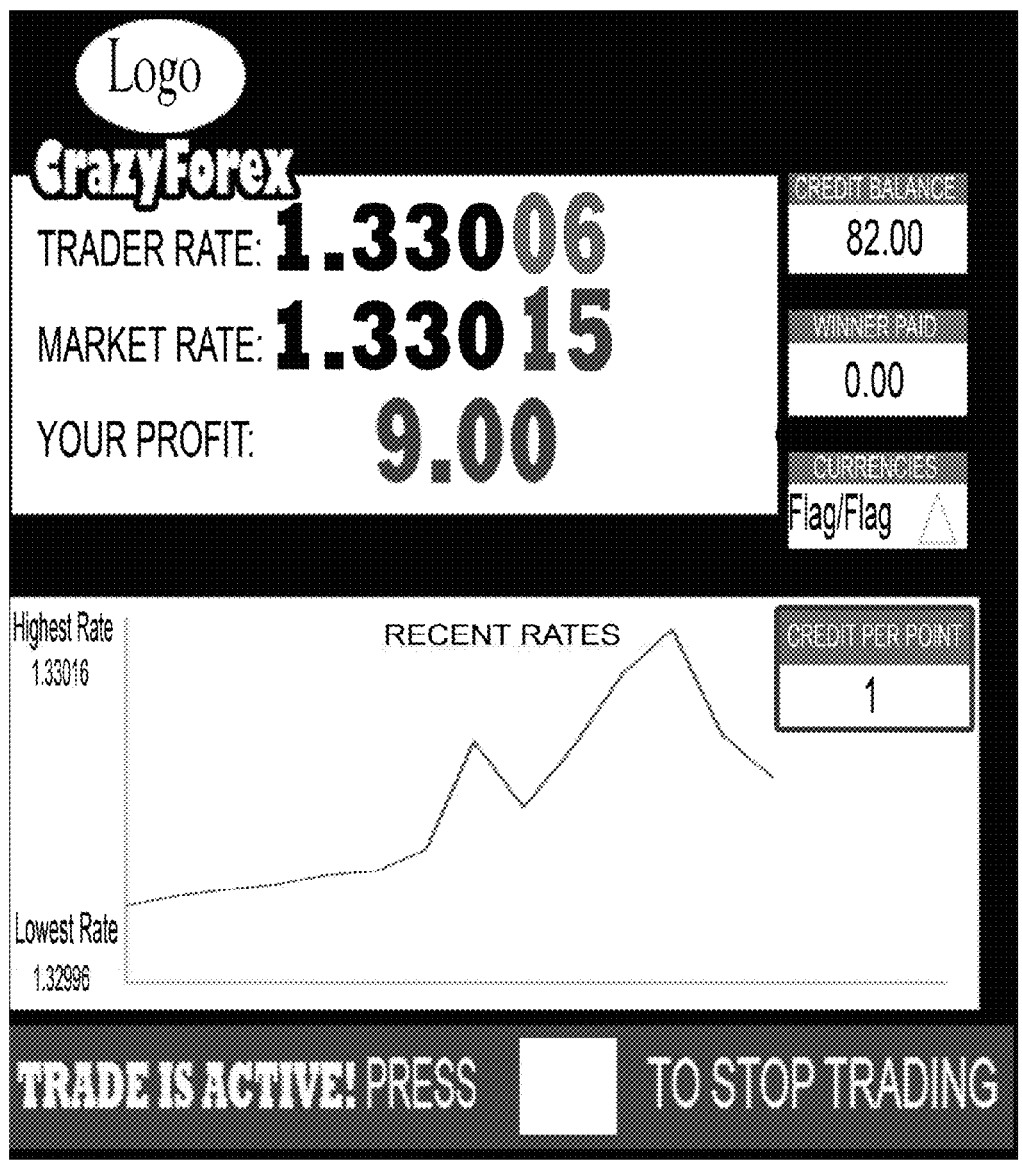

After the user has deposited funds the interface will switch to its active state, as illustrated in FIG. 8. This is the state where the user actually trades.

The screen may contain the following elements:
1. "Credit Balance" section—displays the user's current credit balance.
2. "Winner Paid" section—displays the user's profit from the last trade. If the trader lost all his risked credits on the last trade (Stop loss reached) OR this is his first trade, it will display 0.
3. "Currencies" section—displays the current pair of currencies being traded and if the trade is "long" or "short". Instead of showing the traditional terms "long" or "short", an arrow pointing up or down may be displayed. Up indicating long and down indicating short.
4. "Commission" section—displays to the user the rate of the commission for the selected pair of currencies.
5. "Market Rate" section—displays the current exchange rate in the market according to the selected pair of currencies. There may be an indication of current changes in the market beside the rate. If the exchange rate is increasing, a green arrow pointing up may appear beside the rate. If the exchange rate is decreasing, a red arrow pointing down may appear beside the rate.
6. "Trader Rate" section—displays the initial rate of the current trade. It stays static as long as the position is open and active.
7. "Your Profit" section—displays the user's current profit/loss if he/she were to close the position at that time. Profits may be displayed in green, whereas losses may be displayed in red.
8. "Credits Per Point" section—this section may display the amount of credits to be gained or lost as a result of each unit of change (e.g. point, PIP, Micro pip, etc.) in the price of the F.I. in question. Thus, it may display a value that is indicative of the quantity of the F.I. being traded. This section may be replaced, in some embodiments of the present invention, with a "amount risked" section—which may display the maximum amount the user may lose in the next trade, i.e. stop loss order.
9. "Graph" section—displays to the user a styled graph of the last X quotes for the current pair of currencies.
10. The following sections may also be displayed in the corresponding situations:
    a. "Winning message". This will be visible every time that a position has been closed by the user, when there was a profit (Ignore the commission). A "You Win" animation may appear and the "Winner Paid" section may be animated as well (Display the winning credits amount as an animation of an increasing amount of credits up to the winning amount).
    b. "Out of funds message"—this message informs the user that he/she is out of funds and invites the user to deposit more funds in order to continue trading. The message itself may read: "You are out of credits, please deposit more funds in order to continue trading".

The following sound effects may be associated with this interface:
1. A "Bling" sound when funds are deposited.
2. A "Cavalry charge" sound for successful trades.
3. A simple tone when any button is pressed.
4. A "Cascading coin" sound when pressing Cash out
5. A solid sound when changing between price up/down The user may be able to execute any of the following actions, by pressing the appropriate button on the console's interface assembly, within the "active" state:
1. Switch currencies—may switch the pair of currencies being traded.
2. Change credit value—may change the amount of the relevant currency traded for each credit, i.e. increase/decrease the leverage.
3. Change direction—may switch between long and short trading.
4. Increase/decrease trade amount—may increase/decrease the number of credits to be invested in the next trade.
5. Start trade—may execute a trade of the current pair of currencies being displayed, in accordance with the other settings, i.e. credit value, trade amount, etc.
6. Trade max—may execute a trade of the current pair of currencies being displayed using all of the user's remaining credits.
7. Trade min—may execute a trade of the current pair of currencies being displayed using only one credit.
8. Stop trade—may close the user's current position in relation to the pair of currencies currently being displayed.
9. Cash out—may cause the console to pay out the user and end the session.

Figure 9:
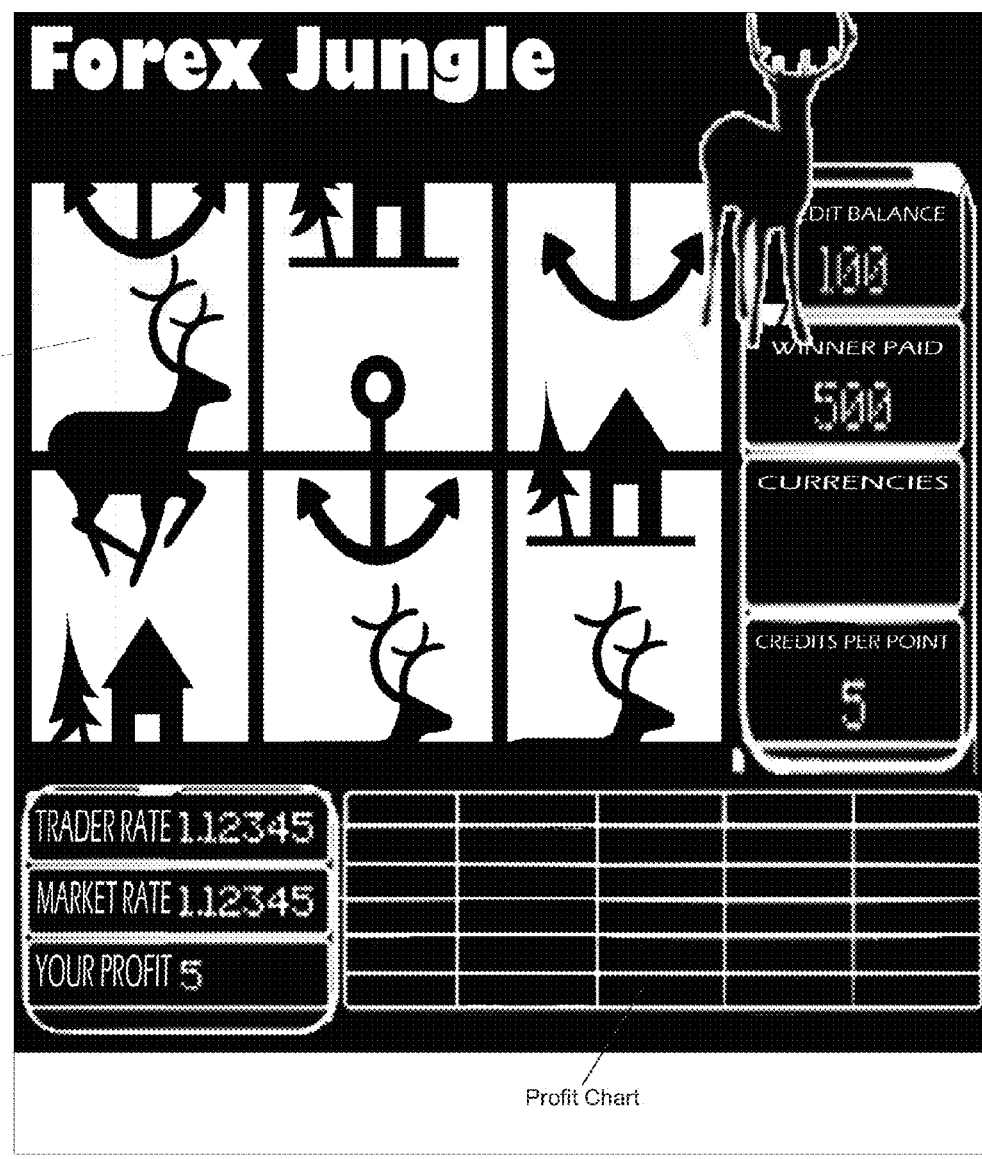

Slot Machine Simulation Interface—this interface may be adapted to allow the user to trade in F.I.'s through an interface that resembles a slot machine, as seen in FIG. 9.

Before the user has deposited funds, or after the deposited funds have been paid out or lost, the interface may be in its "idle" state. The screen may resemble the "active" state with the addition of an animated "Insert Credits" message. The only action the user may execute in the idle state, without depositing funds, is to switch the current F.I. being displayed. This may be accomplished by the push of a button on the console interface assembly.

After the user has deposited funds the interface may switch to its active state. This is the state where the user actually trades.

The screen may contain the following elements:
1. Background—a colorful background matching the specific games theme, e.g. jungle theme may have a jungle like background. The background may also include an appropriate logo.
2. "Credit Balance" section—displays the user's current credit balance.
3. "Winner Paid" section—displays the user's profit from the last trade. If the trader lost all his risked credits on the last trade (Stop loss reached) OR this is his first trade, it will display 0.
4. "Currencies/Stock/Commodity" section—displays the F.I. being traded and if the trade is "long" or "Short". Instead of showing the traditional terms "long" or "short", an arrow pointing up or down may be displayed. Up indicating long and down indicating short.
5. "Commission" section—displays to the user the rate of the commission for the selected F.I.
6. "Market Rate" section—displays the current exchange rate in the market for the selected F.I. There may be an indication of current changes in the market beside the rate. If the exchange rate is increasing, a green arrow pointing up may appear beside the rate. If the exchange rate is decreasing, a red arrow pointing down may appear beside the rate.
7. "Trader Rate" section—displays the initial rate of the current trade. It stays static as long as the position is open and active.
8. "Your Profit" section—displays the user's current profit/loss if he/she were to close the position at that time. Profits may be displayed in green, whereas losses may be displayed in red.
9. "Credits Per Point" section—this section may display the amount of credits to be gained or lost as a result of each unit of change (e.g. point, PIP, Micro pip, etc.) in the price of the F.I. in question. Thus, it may display a value that is indicative of the quantity of the F.I. being traded. This section may be replaced, in some embodiments of the present invention, with a "amount risked" section—which may display the maximum amount the user may lose in the next trade, i.e. stop loss order.
10. Virtual reels—a display resembling 3 slot machine reels, with characters matching the game theme, e.g. jungle theme may have animals as characters. While a trade is in progress the virtual reels may spin so that different characters are located on the center line at each moment, similar to the motion of slot machine reels. When the trade is concluded the virtual reels may stop in accordance with the result of the trade.
11. Profit chart—a table indicating the character combinations corresponding to profitable trades, the profit in points/price movement corresponding to each of said character combinations and the corresponding profit for the user in accordance with the amount of credits that may be risked.
12. The following sections may also be displayed in the corresponding situations:
    a. "Winning message". This will be visible every time that a position has been closed, when there was a profit (Ignore the commission). A "You Win" animation may appear and the "Winner Paid" section may be animated as well (Display the winning credits amount as an animation of an increasing amount of credits up to the winning amount).
    b. "Out of funds message"—this message informs the user that he/she is out of funds and invites the user to deposit more funds in order to continue trading. The message itself may read: "You are out of credits, please deposit more funds in order to continue trading".

The following sound effects may be associated with this interface:
1. A "Bling" sound when funds are deposited.
2. A "Cavalry charge" sound for successful trades.
3. A "Spinning reels" sound while the trade is in progress.
4. A simple tone when any button is pressed.
5. A "Cascading coin" sound when pressing Cash out
6. A solid sound when changing between price up/down The user may be able to execute any of the following actions, by pressing the appropriate button on the console's interface assembly, within the "active" state:

1. Switch F.I.—may switch the F.I. being traded.
2. Change credit value—may change the amount of the relevant F.I. traded for each credit, i.e. increase/decrease the leverage.
3. Change direction—may switch between long and short trading.
4. Increase/decrease trade amount—may increase/decrease the number of credits to be invested in the next trade.
5. Start trade—may execute a trade of the current F.I. being displayed, i.e. spin the virtual reels, in accordance with the other settings, i.e. credit value, trade amount, etc.
6. Trade max—may execute a trade of the current F.I. being displayed using the maximum number of credits allowed by the game.
7. Trade min—may execute a trade of the current F.I. being displayed using only one credit.
8. Stop trade—may close the user's current position in relation to the F.I. currently being displayed.
9. Cash out—may cause the console to pay out the user and end the session.

According to the exemplary embodiment described herein, all trades may inherently include a stop-loss/take-profit order so that the trade will be automatically terminated once the trade has resulted in a loss of the amount of credits risked or an equivalent gain. The trade may also be terminated by user action (pressing "stop trade") or according to a pre-determined time limit.

Upon termination of the trade, according to this exemplary embodiment, the virtual reels may stop spinning. In the event that the trade has resulted in a profit, the virtual reels may stop with the character combination that corresponds to said profit, according to the profit chart, displayed on the center line of the virtual reels. Conversely, in the event that the trade has resulted in a loss, the virtual reels may stop with a character combination, that does not match any of the combinations displayed in the profit chart, displayed on the center line of the virtual reels.

It should be understood by one of skill in the art that some of the functions described as being performed by a specific component of the system may be performed by a different component of the system in other embodiments of this invention.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

I claim:

1. A financial instrument (F.I.) trading system comprising:
a console including a display and a user interface assembly;
first processing circuitry configured to create a session based monetary trading account associated with a user of said console, wherein a session based monetary trading account is a subaccount of a regular trading account and is created upon commencement of a trading session and terminated upon completion of the trading session and wherein monetary trading account is defined as an account in which actual funds are deposited by a user and used to execute F.I. trade orders;
second processing circuitry for receiving F.I. trade orders from the user via said user interface assembly, wherein F.I. trade orders are instructions to purchase or sell financial instruments in exchange for a price of the financial instruments on a financial market; and
a transaction server for facilitating execution of the F.I. trade orders using funds from the session based monetary trading account and configured to credit and debit the session based monetary trading account funds gained or lost as a result of the execution of the F.I. trade orders.

2. The system according to claim 1, further comprising a payment module located in proximity or attached to the console for receiving one or more forms of payment from the user, wherein said first processing circuitry is further configured to create the session based monetary trading account based on funds deposited in said payment module.

3. The system according to claim 2, wherein said first processing circuitry is further configured to credit an existing session based monetary trading account funds received in said payment module.

4. The system according to claim 1, wherein said session based monetary account is a subaccount of a regular trading account maintained by a proprietor of said system with a broker.

5. The system according to claim 4, wherein the trading account includes funds maintained in the regular trading account by the proprietor in order to augment a leverage accorded the user by the broker.

6. The system according to claim 1, wherein said transaction server is further configured to calculate and withhold government taxes owed by the user as a result of activity on the system.

7. The system according to claim 1 wherein the processing circuitry is further adapted to translate one input received from the user via the interface assembly into two or more trade orders.

8. The system according to claim 1 wherein the processing circuitry is further adapted to translate one input received from the user via the interface assembly into two or more trade orders.

9. A method of facilitating trading comprising:
providing a console including a display and a user interface assembly;
creating, by use of first processing circuitry, a session based monetary trading account associated with a user of said console, wherein a session based monetary trading account is a subaccount of a regular trading account and is created upon commencement of a trading session and terminated upon completion of the trading session and wherein monetary trading account is defined as an account in which actual funds are deposited by a user and used to execute F.I. trade orders;
receiving Financial Instrument trade orders from the user via the user interface assembly, wherein Financial Instrument trade orders are instructions to purchase or sell financial instruments in exchange for a price of the financial instruments on a financial market;

executing, by use of second processing circuitry, the F.I. trade orders using funds from the session based monetary trading account; and crediting and debiting, by use of the first processing circuitry, the session based monetary trading account funds gained or lost as a result of the execution of the F.I. trade orders.

10. The method according to claim 9, further comprising receiving payment from the user using a payment module located in proximity or attached to the console and creating a session based monetary trading account based on the received payment.

11. The method according to claim 9, further comprising receiving payment from the user using a payment module located in proximity or attached to the console and crediting the session based monetary trading account funds received via the payment module.

12. The method according to claim 9, wherein said session based monetary account is created as a subaccount of a regular trading account maintained by a proprietor of the console with a broker.

13. The method according to claim 12, further comprising maintaining funds in the regular trading account in order to augment a leverage accorded the user by the broker.

14. The method according to claim 9, further comprising calculating and withholding government taxes owed by the user as a result of activity on the console.

15. A financial instrument (F.I.) trading system comprising:

a console including a display and a user interface assembly;

first processing circuitry configured to create a session based monetary trading account associated with a user of said console, wherein a session based monetary trading account is created upon commencement of a trading session and terminated upon completion of the trading session and wherein monetary trading account is defined as an account in which actual funds are deposited by a user and used to execute F.I. trade orders;

second processing circuitry for receiving F.I. trade orders from the user via said user interface assembly, wherein F.I. trade orders are instructions to purchase or sell financial instruments in exchange for a price of the financial instruments on a financial market; and a transaction server configured to credit and debit the session based monetary trading account funds that would be gained or lost as a result of the execution of the F.I. trade orders.

16. The system according to claim 15, further comprising a payment module located in proximity or attached to the console for receiving one or more forms of payment, wherein said first processing circuitry is further configured to create the session based monetary trading account based on funds deposited in said payment module.

17. The system according to claim 16, wherein said first processing circuitry is further configured to credit an existing session based monetary trading account funds received by said payment module.

18. The system according to claim 15, wherein said transaction server is further configured to calculate and withhold government taxes owed by the user as a result of activity on the system.

* * * * *